Patented Sept. 2, 1952

2,609,405

UNITED STATES PATENT OFFICE 2,609,405

PLASTICIZING RUBBER

Maynard F. Torrence, Woodstown, N. J., assignor to E. I. du Pont de Nemours & Company, Wilmington, Del., a corporation of Delaware No Drawing. Application December 3, 1949, Serial No. 131,063

23 Claims. (Cl. 260—761)

This invention relates to a process for plasticizing rubber, novel plasticizing compositions and the resulting plasticized rubber.

It is well known that rubber, when subjected to mechanical working in the presence of air or oxygen, is rendered more plastic. The degree of plasticization is determined to a large extent by the time and temperature of milling. When milled for a sufficient length of time, rubber becomes very soft and at the same time will lose much of its ability to vulcanize. In order to reduce the time of milling and to prevent the deteriorating action of continued milling, it is common practice to add to the rubber, during the milling operation, certain materials which assist in producing a more plastic and workable product. Materials which have been commonly used are oils, esters, waxes, fats, alcohols, acids, resins and the like which assist in the production of soft rubber, either by a swelling action on the rubber hydrocarbon or by acting as a lubricant. Some of the more common softeners are mineral oil, pine tar, palm oil, rosin oil, dibutyl phthalate, paraffin wax, glycerine and stearic acid. Relatively large amounts of these agents must be used to produce the desired softness. The presence of these so-called "physical softeners" impairs a number of the physical properties of the resulting vulcanizate and for this reason their use is undesirable.

Aromatic mercaptans and aromatic mercaptides of divalent heavy metals are now well known as chemical plasticizing agents for natural and synthetic rubbers as disclosed in U. S. Letters Patent 2,064,580, 2,378,519 and 2,467,789. Such chemical plasticizing agents soften rubber without requiring the addition of harmful swelling agents and lubricants, such as oils, which continue to affect the physical properties of the rubber after vulcanization. However, such mercaptans and mercaptides are relatively expensive and this has somewhat limited their use.

This invention has as an object to provide organic compositions, which, when added in small amounts to rubber during processing, will not only materially decrease the time necessary for breakdown of the rubber, but will also greatly decrease the overall time necessary for the addition of compounding agents. A further object of this invention is to provide organic chemicals which, when added to rubber, will increase the plasticity of the raw product sufficiently to produce better molding properties and superior extrusion characteristics. Another object is to provide organic compositions which will act at relatively low temperatures, 100–200° C., making the design of new and costly equipment unnecessary. A more specific object is to provide rubber plasticizing agents having the known advantages of the aromatic mercaptans and mercaptides, but which are effective in smaller amounts. A still further object is to provide a new and improved process for plasticizing rubber. Still other objects are to provide new compositions of matter and to advance the art. Still further objects will appear hereinafter.

The above and other objects of my invention may be accomplished by mixing into rubber from about 0.003% to about 0.5% by weight, based on the rubber, of a rubber plasticizing agent of the group of aromatic mercaptans and aromatic mercaptides of divalent heavy metals and from about 0.0004% to about 0.05% by weight, based on the rubber, of a substantially neutral nickel dithiocarbamate. Further objects of my invention are accomplished by providing rubber plasticizing compositions which are composed of from about 0.2 to about 5000 parts of the aromatic mercaptan or mercaptide and 1 part of the nickel dithiocarbamate which may be simple mixtures of such ingredients, solutions of the nickel dithiocarbamate in the mercaptan, or solutions of such two ingredients in a substantially neutral mutual organic solvent, such as a hydrocarbon, alcohol or ester or mixtures of any two or more thereof.

By the use of the plasticizing compositions of my invention, rubber can be effectively plasticized to any desired degree whereby the time necessary for breakdown of the rubber and the addition of compounding ingredients to the rubber will be materially decreased and will be accomplished more readily with appreciable savings in labor and power consumption. I have found that, while the nickel dithiocarbamates have little or no plasticizing action on rubber by themselves, they are very strong promoters of the plasticization of rubber by aromatic mercaptans and their mercaptides. Thus, the use of a small amount of the nickel dithiocarbamate with the aromatic mercaptan or mercaptide so increases the plasticizing action of the mercaptan and mercaptide that it is possible to obtain a greater plasticizing of the rubber with approximately half the amount of mercaptan that would be used in the absence of the nickel dithiocarbamate. Therefore, it is possible to obtain the desired plasticizing effect on the rubber with materially less amounts of plasticizing agent, particularly mercaptan and mercaptide, resulting in a distinct saving in cost and increasing the usefulness of the aromatic mercaptans and mercaptides.

The aromatic mercaptans and mercaptides may be those known to the art as useful for plasticizing natural and synthetic rubbers and will include aryl mercaptans, aryl polymercaptans and substituted derivatives thereof in which the substituents may be halogen, hydroxyl, nitro, amino, carboxyl, ester and like groups. The aromatic groups may be of the benzene, naphthalene, diphenyl and anthracene series. The aromatic mercaptans and mercaptides have the sulfur directly bonded to a ring carbon atom of a benzene ring. It will usually be preferred to employ the aryl mercaptans and mercaptides, the term "aryl" being used in its commonly accepted sense as meaning an aromatic hydrocarbon radical. By a heavy metal, I mean a metal having a density greater than 4.0. Ordinarily, the heavy metals employed for forming the aromatic mercaptides will be zinc, cadmium, nickel, tin and lead, of which zinc will usually be preferred.

The dithiocarbamates must be the nickel dithiocarbamates, as corresponding dithiocarbamates of other metals do not have comparable promoting effects on the aromatic mercaptans and mercaptides. The nickel dithiocarbamates should be substantially neutral, that is, they should be free of strongly acidic groups and strongly basic groups. The valences of the nitrogen of the dithiocarbamic acid groups may be satisfied by hydrogen, hydrocarbon radicals or substituted hydrocarbon radicals in which the substituents may be cyclic ethereal oxygen, secondary amino or alcoholic hydroxyl groups. The hydrocarbon groups may be alkyl, aryl, olefinic or alicyclic groups. Preferably, both of the valences of the nitrogen will be satisfied by one or more hydrocarbon groups, including a divalent hydrocarbon group which forms with the nitrogen a heterocyclic ring. Also, the hydrocarbon group may link together 2 dithiocarbamate groups. In all cases, the activity of the dithiocarbamates for the purposes of the present invention depends primarily on the presence in the molecule of the nickel atom attached to 2 dithiocarbamic residues, rather than upon the organic groups attached to the nitrogen.

The quantities of the mercaptans or mercaptides and the nickel dithiocarbamates, that is, the composition and quantity of the plasticizing mixture, will be chosen according to the degree of plasticizing required, the temperature and degree of mechanical working to be employed and the type of rubber to be treated. The amount of aromatic mercaptan employed may be in the range of from about 0.003% to about 0.5% by weight, based on the rubber, and, preferably, in the proportion of from about 0.005% to about 0.15%. The amount of the nickel dithiocarbamate may be from about 0.0004% to about 0.05% by weight, based on the rubber, and, preferably, from about 0.001% to about 0.02%. The ratio of aromatic mercaptan or mercaptide to nickel dithiocarbamate may vary from about 0.2 to about 5000 parts of mercaptan or mercaptide to each part of nickel dithiocarbamate and, preferably, from about 5 to about 20 parts of mercaptan or mercaptide to each part of nickel dithiocarbamate; provided that the proportions of each added to the rubber is maintained within the range above set forth.

While the mercaptan or the mercaptide and the nickel dithiocarbamate may be separately added to the rubber, it will usually be preferred to mix them to provide plasticizing compositions to be added to the rubber. Usually, the nickel dithiocarbamate will dissolve in the mercaptan in the desired proportions to provide a stable composition which can be used as such. In other cases, simple mixtures may be used, with or without an inert solid diluent. The solid diluent may be any filler or pigment for rubber, such as clay, whiting, carbon black, talc, silica, barytes and the like. The amount of solid diluent may be any amount up to that which it is desired to have in the final rubber composition. Ordinarily, it will be desirable to dissolve the required proportions of mercaptan or mercaptide and nickel dithiocarbamate in a substantially neutral mutual organic solvent so as to contain the plasticizing mixture in a concentration of from about 10% to about 50% by weight in the solvent. Suitable solvents are hydrocarbons, alcohols and esters which may be aromatic, aliphatic or cycloaliphatic. Preferably, the solvent is one which is volatile under the processing conditions to be used or is a substance, such as a lubricating oil, which is commonly used in the compounding of rubber. Mixtures of 2 or more solvents may be employed and, where an aromatic mercaptide is involved, the solvent should include an alcohol. Representative solvents which may be employed are those disclosed in U. S. Patents 2,064,530, 2,378,519, 2,467,789, hereinbefore referred to, and in U. S. Patent 2,413,531.

The plasticizing agents and compositions will be incorporated in the raw rubber during the conventional peptizing and plasticizing processes. Such processes will be ordinarily carried out in standard rubber processing equipment, such as a Gordon Plasticator, Banbury mixer, Werner-Pfleiderer mixer, or on a rubber mill. The plasticizing process should be carried out at a temperature of from about 100° C. to about 200° C.

In order to more clearly illustrate my invention, preferred modes of carrying the same into effect and the advantageous results to be obtained thereby, the following examples are given:

EXAMPLE I 30 parts of smoked sheet rubber were placed on a small (6" x 2") rubber mill and masticated for 3 minutes at 135° C. The agents to be tested were then added in the quantity (per cent by weight) indicated in the following Tables 1 and 2 and mixed with the rubber at 135° C. for 12 minutes. The plasticized rubber so obtained was removed as a sheet and folded. Plasticity pellets were cut from a sample of the plasticized polymer and plasticity and recovery measured on a Williams' parallel plate plastomer (Williams, Ind. Eng. Chem., 16, 362, 1924), following the procedure used in Patent No. 2,467,789. Data obtained, using a mixture of xylyl mercaptan and nickel dibutyldithiocarbamate as a processing agent for rubber, are recorded in Table 1.

TABLE 1

*Williams' plasticity-recovery measurements*

| Aromatic Thiol | Percent Used | Promoter | Percent Used | P[1] | R[1] |
|---|---|---|---|---|---|
| None | | None | | 182 | 60 |
| Xylyl Mercaptan | 0.018 | ----do---- | | 145 | 40 |
| Do | 0.036 | ----do---- | | 112 | 5 |
| Do | 0.072 | ----do---- | | 96 | 3 |
| | | Nickel dibutyldithiocarbamate | 0.15 | 156 | 20 |
| Xylyl Mercaptan | 0.036 | ----do---- | 0.01 | 81 | 1 |
| Do | 0.036 | ----do---- | 0.02 | 75 | 0 |
| Do | 0.036 | ----do---- | 0.04 | 63 | 0 |

[1] As more fully explained in Patent No. 2,467,789, P is the plasticity number or thickness of the standard test pellet immediately after compression and is inversely proportional to the plasticity, and R is a measure of the recovery of the sample after removal of the compressing force.

The information listed in Table 1 shows that nickel dibutyldithiocarbamate, while not a very effective softening agent when used alone even in large amounts, is a very strong promoter of the thiol peptization of natural rubber and that its use, in small amounts with the mercaptan, makes it possible to get a greater softening with, for example 0.036% of mercaptan than with twice that amount of mercaptan used alone. This effect is not limited to nickel dibutyldithiocarbamate, but is general for the class of nickel dithiocarbamates as shown in Table 2.

EXAMPLE II 72 parts by weight of xylyl mercaptan, 10 parts by weight of nickel dibutyl dithiocarbamate (abbreviated as NBC) and 128 parts by weight of kerosene, were mixed in a glass vessel and heated at 135° C. for 1 hour to obtain a solution of mercaptan and nickel salt in kerosene. On cooling to room temperature, no precipitation was noted, indicating complete solution of the dithiocarbamate in the mercaptan-kerosene mixture. The above solution was tested as a peptizing agent for rubber as in Example I. The ratio of mercaptan to dithiocarbamate in the above mixture is 7.2/1. The proportions and results are given in Table 3 in which the per cent of peptizing agent solution, xylyl mercaptan and nickel dibutyldithiocarbamate are per cent by weight based on the rubber.

TABLE 2

*Williams' plasticity-recovery measurements*

| Aromatic Thiol | Percent Used | Promoter | Percent Used | P | R |
|---|---|---|---|---|---|
| Xylyl Mercaptan | 0.055 | Nickel dimethyldithiocarbamate | 0.05 | 63 | 2 |
| Do | 0.055 | Nickel diethyldithiocarbamate | 0.05 | 63 | 1 |
| Do | 0.055 | Nickel dipropyldithiocarbamate | 0.05 | 66 | 2 |
| Do | 0.055 | Nickel diisopropyldithiocarbamate | 0.05 | 63 | 1 |
| Do | 0.055 | Nickel di(2-ethyl hexyl) dithiocarbamate | 0.05 | 77 | 1 |
| Do | 0.055 | Nickel phenyl ethyl dithiocarbamate | 0.05 | 67 | 1 |
| Do | 0.055 | 4-Morpholine carbodithioic acid nickel salt | 0.05 | 69 | 1 |
| Do | 0.055 | Nickel diallyldithiocarbamate | 0.05 | 69 | 2 |
| Do | 0.055 | 1-Pipecoline carbodithioic acid nickel salt | 0.05 | 61 | 1 |
| Do | 0.055 | 1-Piperidine carbodithioic acid nickel salt | 0.05 | 70 | 1 |
| Do | 0.055 | Nickel ethylene-bis-(dithiocarbamate) | 0.05 | 93 | 3 |
| Do | 0.036 | Nickel dithiocarbanilate | 0.05 | 101 | 2 |
| Do | 0.036 | Nickel sec-butyl (p-sec-butylaminophenyl) dithiocarbamate | 0.05 | 79 | 1 |
| Do | 0.055 | None | | 127 | 12 |
| None | | ----do---- | | 210 | 68 |

TABLE 3

| Per Cent Peptizing Agent Solution Used | Per Cent Mercaptan | Per Cent NBC | P | R |
|---|---|---|---|---|
| None | None | None | 191 | 70 |
| 0.01 | 0.0035 | 0.00048 | 160 | 40 |
| 0.02 | 0.0069 | 0.00095 | 144 | 25 |
| 0.03 | 0.0104 | 0.0014 | 133 | 17 |
| 0.04 | 0.0138 | 0.0019 | 125 | 12 |
| 0.05 | 0.0173 | 0.0024 | 115 | 6 |
| 0.10 | 0.035 | 0.0048 | 100 | 5 |
| 0.15 | 0.052 | 0.0071 | 86 | 3 |

EXAMPLE III

Using the testing procedure outlined in Example I, nickel dibutyldithiocarbamate catalyzes the peptization of natural rubber when used in combination with various substituted aromatic thiols. Data is recorded in Table 4.

TABLE 4

*Williams' plasticity-recovery measurements*

| Aromatic Thiol | Percent Used | Promoter | Percent Used | P | R |
|---|---|---|---|---|---|
| None | | None | | 191 | 70 |
| Xylyl Mercaptan | 0.055 | ----do---- | | 103 | 5 |
| Do | 0.036 | Nickel dibutyldithiocarbamate | 0.05 | 65 | 0 |
| p-Thiocresol | 0.10 | None | | 94 | 3 |
| Do | 0.05 | Nickel dibutyldithiocarbamate | 0.05 | 68 | 0 |
| o-Thiocresol | 0.10 | None | | 102 | 4 |
| Do | 0.05 | Nickel dibutyldithiocarbamate | 0.05 | 67 | 1 |
| 2-Mercapto benzoic acid methyl ester | 0.10 | None | | 122 | 7 |
| Do | 0.05 | Nickel dibutyldithiocarbamate | 0.05 | 62 | 0 |
| 2-Mercapto terephthalic acid dimethyl ester | 0.05 | ----do---- | 0.05 | 70 | 1 |
| 1,5-Dimercaptonaphthalene | 0.05 | ----do---- | 0.05 | 57 | 0 |

EXAMPLE IV

The peptizing agents of this invention are effective over a rather wide temperature range. Combinations of xylyl mercaptan and nickel dibutyldithiocarbamate were compounded with smoked sheet rubber and tested using the procedure outlined in Example I, except that the temperature was varied. Data obtained is recorded in Table 5.

TABLE 5
*Williams' plasticity-recovery measurements*

| Aromatic Thiol | Percent Used | Promoter | Percent Used | Temp. of Milling °C. | P | R |
|---|---|---|---|---|---|---|
| Xylyl Mercaptan | 0.036 | None | | 105 | 120 | 4 |
| Do | 0.036 | Nickel dibutyldithiocarbamate | 0.01 | 105 | 98 | 5 |
| Do | 0.036 | do | 0.03 | 105 | 86 | 2 |
| Do | 0.036 | None | | 135 | 112 | 5 |
| Do | 0.036 | Nickel dibutyldithiocarbamate | 0.01 | 135 | 81 | 1 |
| Do | 0.036 | do | 0.03 | 135 | 71 | 0 |

EXAMPLE V 30 parts of smoked sheet rubber were placed on a small (6" x 2") rubber mill and masticated for 3 minutes at 135° C. The agents to be tested were then added in the quantity (per cent by weight) in the following Tables 6 and 7 and mixed with the rubber at 135° C. for 12 minutes. The plasticized rubber so obtained was removed as a sheet and folded. Plasticity pellets were cut from a sample of the plasticized polymer and plasticity and recovery measured on a Williams' parallel plate plastometer following the procedure used in Example I. Data obtained, using a mixture of nickel dibutyldithiocarbamate and zinc xylyl mercaptide as a processing agent for rubber, are recorded in Table 6.

TABLE 6
*Williams' plasticity-recovery measurements*

| Mercaptide | Percent Used | Promoter | Percent Used | P | R |
|---|---|---|---|---|---|
| None | | None | | 182 | 60 |
| Zinc xylyl Mercaptide | 0.10 | | | 115 | 7 |
| Zinc xylyl Mercaptide | | Nickel dibutyldithiocarbamate | 0.15 | 156 | 20 |
| | 0.05 | do | 0.05 | 63 | 1 |

The information listed in Table 6 shows that nickel dibutyldithiocarbamate is a very strong promoter for zinc xylyl mercaptide and its use, in small amounts with the mercaptide, makes it possible to obtain even greater softening than with 0.10% of the mercaptide alone. This effect is not limited to zinc xylyl mercaptide but is also shown with other aromatic mercaptides as shown in Table 7.

TABLE 7
*Williams' plasticity-recovery measurements*

| Mercaptide | Percent Used | Promoter | Percent Used | P | R |
|---|---|---|---|---|---|
| None | | None | | 182 | 60 |
| Cadmium xylyl mercaptide | 0.10 | | | 137 | 5 |
| Do | 0.05 | Nickel dibutyldithiocarbamate | 0.05 | 74 | 0 |
| Nickel xylyl mercaptide | 0.10 | | | 151 | 18 |
| Do | 0.05 | Nickel dibutyldithiocarbamate | 0.05 | 93 | 2 |
| Tin naphthyl mercaptide | 0.10 | | | 134 | 23 |
| Do | 0.05 | Nickel dibutyldithiocarbamate | 0.05 | 80 | 1 |
| Lead xylyl mercaptide | 0.10 | | | 110 | 6 |
| Do | 0.05 | Nickel dibutyldithiocarbamate | 0.05 | 89 | 2 |

EXAMPLE VI

Using the same technique as described in Examples I and V, a series of zinc mercaptides were evaluated in conjunction with nickel dibutyldithiocarbamate as peptizing agents for rubber. The data are summarized in Table 8.

TABLE 8
*Williams' plasticity-recovery measurements*

| Mercaptide | Percent Used | Promoter | Percent Used | P | R |
|---|---|---|---|---|---|
| Zinc-2-mercapto-benzoic acid methyl ester | 0.10 | | | 112 | 8 |
| Do | 0.05 | Nickel dibutyldithiocarbamate | 0.05 | 70 | 0 |
| Zinc-chlorophenyl mercaptide | 0.10 | | | 119 | 8 |
| Do | 0.05 | Nickel dibutyldithiocarbamate | 0.05 | 74 | 1 |
| Zinc-dichlorophenyl mercaptide | 0.10 | | | 104 | 4 |
| Do | 0.05 | Nickel dibutyldithiocarbamate | 0.05 | 78 | 2 |
| Zinc-trichlorophenyl mercaptide | 0.10 | | | 92 | 2 |
| Do | 0.05 | Nickel dibutyldithiocarbamate | 0.05 | 56 | 1 |
| Zinc-thio-β-naphthyl mercaptide | 0.10 | | | 174 | 64 |
| Do | 0.05 | Nickel dibutyldithiocarbamate | 0.05 | 126 | 8 |
| Zinc-o-aminophenyl mercaptide | 0.10 | | | 113 | 7 |
| Do | 0.05 | Nickel dibutyldithiocarbamate | 0.05 | 100 | 4 |

EXAMPLE VII

Other nickel dithiocarbamates are also effective promoters for aromatic mercaptides. Using the testing procedure outlined in Examples I and V, a series of nickel dithiocarbamates were evaluated as promoters for zinc xylyl mercaptide. The data are shown in Table 9.

TABLE 9

*Williams' plasticity-recovery measurements*

| Mercaptide | Percent Used | Nickel Dithiocarbamate | Percent Used | P | R |
|---|---|---|---|---|---|
| None | | None | | 172 | 63 |
| Zinc xylyl mercaptide | 0.10 | | | 135 | 18 |
| Do | 0.05 | Nickel dimethyldithiocarbamate | 0.05 | 84 | 2 |
| Do | 0.05 | Nickel diethyldithiocarbamate | 0.05 | 88 | 3 |
| Do | 0.05 | Nickel diisopropyldithiocarbamate | 0.05 | 79 | 1 |
| Do | 0.05 | Nickel dibutyldithiocarbamate | 0.05 | 62 | 0 |
| Do | 0.05 | 4-Morpholine carbodithioic acid nickel salt | 0.05 | 91 | 3 |
| Do | 0.05 | 1-Piperidine carbodithioic acid nickel salt | 0.05 | 96 | 4 |
| Do | 0.05 | Nickel phenyl ethyl dithiocarbamate | 0.05 | 91 | 3 |

It will be understood that the preceding examples are given for illustrative purposes solely and that my invention is not to be limited to the specific embodiments disclosed therein, but that many variations and modifications may be made therein without departing from the spirit or scope of my invention.

Examples of other aromatic mercaptans that are plasticizing agents for rubber and may be used in conjunction with nickel dithiocarbamates in accord with my invention are thiophenol, o-chloro thiophenol, dichloro thiophenol, trichloro thiophenol, pentachloro thiophenol, nitro thiophenol, mono- and di-thio resorcinol, o-amino thiophenol, 3-mercapto benzoic acid, 4-mercapto benzoic acid, thio-$\alpha$-naphthol, thio-$\beta$-naphthol, mercapto anthracene and mercapto anthraquinone. Mixtures of isomeric thiols prepared by treatment of aromatic hydrocarbons, such as xylene and naphthalene, with sulfur chloride followed by reduction to the thiol are also effective. Such a mixture of naphthyl mercaptans is a commercial plasticizing agent for rubber. The preferred aromatic mercaptans are xylyl mercaptan, thio-$\alpha$-naphthol and thio-$\beta$-naphthol.

Examples of other aromatic mercaptides that are plasticizing agents for rubber and may be used in conjunction with nickel dithiocarbamates are zinc phenyl mercaptide, zinc-o-nitrophenyl mercaptide, zinc-o-hydroxyphenyl mercaptide, zinc-o-carboxyphenyl mercaptide, zinc-thio-$\alpha$-naphthyl mercaptide, zinc anthryl mercaptide and zinc anthraquinonyl mercaptide. The preferred mercaptides are zinc xylyl mercaptide, cadmium xylyl mercaptide and lead xylyl mercaptide.

Examples of other nickel dithiocarbamates that may be used for the purpose of this invention are nickel dithiocarbamate, nickel cyclohexyl dithiocarbamate, nickel dicyclohexyl dithiocarbamate, nickel hexamethylene-bis (dithiocarbamate), nickel sec-butyl dithiocarbamate, nickel phenyl methyl dithiocarbamate, nickel 1-naphthyl dithiocarbamate, nickel 2-naphthyl dithiocarbamate, nickel (2-hydroxy ethyl) dithiocarbamate, nickel-bis (2-hydroxy ethyl) dithiocarbamate, and nickel ethyl dithiocarbamate. The preferred compounds are nickel dibutyl dithiocarbamate, nickel dimethyl dithiocarbamate, nickel phenyl ethyl dithiocarbamate and 4-morpholine carbodithioic acid nickel salt.

It will be apparent that, by my invention, the breakdown of rubber can be accomplished more completely and in a shorter period of time with appreciable savings in labor and power consumption, and consequently a much greater output from each piece of rubber equipment. There is also a saving in cost of plasticizing agent. Furthermore, the plasticizing agents disperse well in rubber, soften the rubber, and also improve the processing characteristics of the rubber and the ease with which other compounding ingredients are incorporated. Thus, it will be apparent that my invention constitutes a valuable advance and contribution to the art.

I claim:

1. The process for improving the plasticity of rubber which comprises mixing into the rubber from about 0.003% to about 0.5% of a rubber plasticizing agent of the group consisting of aromatic mercaptans and aromatic mercaptides of divalent heavy metals and from about 0.0004% to about 0.5% of a substantially neutral nickel dithiocarbamate.

2. The process for improving the plasticity of rubber which comprises mixing into the rubber from about 0.003% to about 0.5% of a rubber plasticizing aromatic mercaptan and from about 0.0004% to about 0.05% of a substantially neutral nickel dithiocarbamate.

3. The process for improving the plasticity of rubber which comprises mixing into the rubber from about 0.003% to about 0.5% of xylyl mercaptan and from about 0.0004% to about 0.05% of a substantially neutral nickel dithiocarbamate.

4. The process for improving the plasticity of rubber which comprises mixing into the rubber from about 0.003% to about 0.5% of a rubber plasticizing aromatic mercaptide of a divalent heavy metal and from about 0.0004% to about 0.05% of a substantially neutral nickel dithiocarbamate.

5. The process for improving the plasticity of rubber which comprises mixing into the rubber from about 0.003% to about 0.5% of zinc xylyl mercaptide and from about 0.0004% to about 0.05% of a substantially neutral nickel dithiocarbamate.

6. The process for improving the plasticity of rubber which comprises mixing into the rubber from about 0.003% to about 0.5% of a rubber plasticizing agent of the group consisting of aromatic mercaptans and aromatic mercaptides of divalent heavy metals and from about 0.0004% to about 0.05% of a neutral nickel dialkyl dithiocarbamate.

7. The process for improving the plasticity of rubber which comprises mixing into the rubber from about 0.003% to about 0.5% of a rubber plasticizing aromatic mercaptan and from about 0.0004% to about 0.05% of a neutral nickel dialkyl dithiocarbamate.

8. The process for improving the plasticity of rubber which comprises mixing into the rubber from about 0.003% to about 0.5% of a rubber plasticizing aromatic mercaptide of a divalent heavy metal and from about 0.0004% to about 0.5% of a neutral nickel dialkyl dithiocarbamate.

9. A composition, suitable for plasticizing rubber, which comprises essentially from about 0.003 to about 0.5 part of a rubber plasticizing agent of the group consisting of aromatic mercaptans and aromatic mercaptides of divalent heavy metals and from about 0.0004 to about 0.05 part of a substantially neutral nickel dithiocarbamate, which is a strong promoter of the plasticizing action of the plasticizing agent.

10. A composition, suitable for plasticizing rubber, which comprises essentially from about 0.003 to about 0.5 part of a rubber plasticizing aromatic mercaptan and from about 0.0004 to about 0.05 part of a substantially neutral nickel dithiocarbamate, which is a strong promoter of the plasticizing action of the mercaptan.

11. A composition, suitable for plasticizing rubber, which comprises essentially from about 0.003 to about 0.5 part of xylyl mercaptan and from about 0.0004 to about 0.05 part of a substantially neutral nickel dithiocarbamate, which is a strong promoter of the plasticizing action of the mercaptan.

12. A composition, suitable for plasticizing rubber, which comprises essentially from about 0.003 to about 0.5 part of a rubber plasticizing aromatic mercaptide of a divalent heavy metal and from about 0.0004 to about 0.05 part of a substantially neutral nickel dithiocarbamate, which is a strong promoter of the plasticizing action of the mercaptide.

13. A composition, suitable for plasticizing rubber, which comprises essentially from about 0.003 to about 0.5 part of zinc xylyl mercaptide and from about 0.0004 to about 0.05 part of a substantially neutral nickel dithiocarbamate, which is a strong promoter of the plasticizing action of the mercaptide.

14. A composition, suitable for plasticizing rubber, which comprises essentially from about 0.003 to about 0.5 part of a rubber plasticizing agent of the group consisting of aromatic mercaptans and aromatic mercaptides of divalent heavy metals and from about 0.0004 to about 0.05 part of a neutral nickel dialkyl dithiocarbamate, which is a strong promoter of the plasticizing action of the plasticizing agent.

15. A composition, suitable for plasticizing rubber, which comprises essentially from about 0.003 to about 0.5 part of a rubber plasticizing agent of the group consisting of aromatic mercaptans and aromatic mercaptides of divalent heavy metals and from about 0.0004 to about 0.05 part of a substantially neutral nickel dithiocarbamate, which is a strong promoter of the plasticizing action of the plasticizing agent, dissolved in a concentration of from about 10% to about 50% by weight in a substantially neutral mutual organic solvent of at least one member of the class consisting of hydrocarbons, alcohols and esters.

16. A composition, suitable for plasticizing rubber, which comprises essentially from about 0.003 to about 0.5 part of a rubber plasticizing aromatic mercaptan and from about 0.0004 to about 0.05 part of a substantially neutral nickel dithiocarbamate, which is a strong promoter of the plasticizing action of the mercaptan, dissolved in a concentration of from about 10% to about 50% by weight in a substantially neutral mutual organic solvent of at least one member of the class consisting of hydrocarbons, alcohols and esters.

17. A composition, suitable for plasticizing rubber, which comprises essentially from about 0.003 to about 0.5 part of xylyl mercaptan and from about 0.0004 to about 0.05 part of a substantially neutral nickel dithiocarbamate, which is a strong promoter of the plasticizing action of the mercaptan, dissolved in a concentration of from about 10% to about 50% by weight in a substantially neutral mutual organic solvent of at least one member of the class consisting of hydrocarbons, alcohols and esters.

18. A composition, suitable for plasticizing rubber, which comprises essentially from about 0.003 to about 0.5 part of a rubber plasticizing aromatic mercaptide of a divalent heavy metal and from about 0.0004 to about 0.05 part of a substantially neutral nickel dithiocarbamate, which is a strong promoter of the plasticizing action of the mercaptide, dissolved in a concentration of from about 10% to about 50% by weight in a substantially neutral mutual organic solvent of at least one member of the class consisting of hydrocarbons, alcohols and esters.

19. A composition, suitable for plasticizing rubber, which comprises essentially from about 0.003 to about 0.5 part of zinc xylyl mercaptide and from about 0.0004 to about 0.05 part of a substantially neutral nickel dithiocarbamate, which is a strong promoter of the plasticizing action of the mercaptide, dissolved in a concentration of from about 10% to about 50% by weight in a substantially neutral mutual organic solvent of at least one member of the class consisting of hydrocarbons, alcohols and esters.

20. A composition, suitable for plasticizing rubber, which comprises essentially from about 0.003 to about 0.5 part of a rubber plasticizing agent of the group consisting of aromatic mercaptans and aromatic mercaptides of divalent heavy metals and from about 0.0004 to about 0.05 part of a neutral nickel dialkyl dithiocarbamate, which is a strong promoter of the plasticizing action of the plasticizing agent, dissolved in a concentration of from about 10% to about 50% by weight in a substantially neutral mutual organic solvent of at least one member of the class consisting of hydrocarbons, alcohols and esters.

21. A composition suitable for plasticizing rubber, which comprises essentially from about 0.003 to about 0.5 part of a rubber plasticizing agent of the group consisting of aromatic mercaptans and aromatic mercaptides of divalent heavy metals and from about 0.0004 to about 0.05 part of neutral nickel dibutyldithiocarbamate, which is a strong promoter of the plasticizing action of the plasticizing agent.

22. A composition suitable for plasticizing rubber, which comprises essentially from about 0.003 to about 0.5 part of xylyl mercaptan and from about 0.0004 to about 0.05 part of neutral nickel dibutyldithiocarbamate, which is a strong promoter of the plasticizing action of the mercaptan.

23. A composition suitable for plasticizing rubber, which comprises essentially from about 0.003 to about 0.5 part of zinc xylyl mercaptide and from about 0.0004 to about 0.05 part of neutral nickel dibutyldithiocarbamate, which is a strong promoter of the plasticizing action of the mercaptide.

MAYNARD F. TORRENCE.

REFERENCES CITED

The following references are of record in the file of this patent:

UNITED STATES PATENTS

| Number | Name | Date |
| --- | --- | --- |
| 1,386,153 | Bruni | Aug. 2, 1921 |
| 2,002,800 | Schrauth | May 28, 1935 |
| 2,102,547 | Sebrell | Dec. 14, 1937 |
| 2,184,238 | Lichty | Dec. 19, 1939 |
| 2,258,847 | Cramer | Oct. 14, 1941 |
| 2,374,667 | Dangelmajer | May 1, 1945 |
| 2,376,339 | Browning et al. | May 22, 1945 |
| 2,414,145 | Evans | Jan. 14, 1947 |